UNITED STATES PATENT OFFICE.

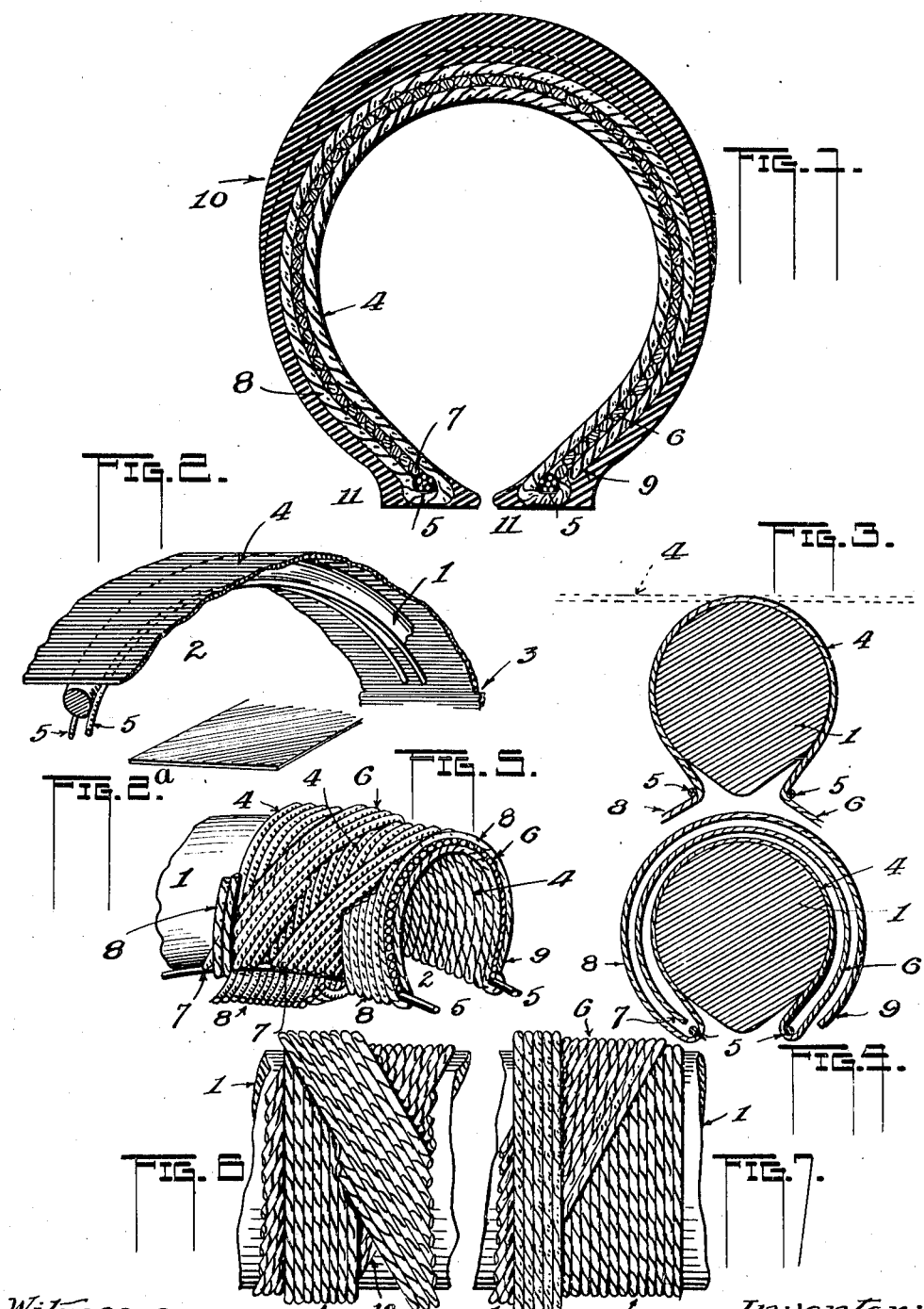

OLIVER H. CLOYD, OF PEORIA, ILLINOIS, ASSIGNOR, BY MESNE ASSIGNMENTS, TO CROWN TIRE & RUBBER COMPANY, OF RALSTON, NEBRASKA, A CORPORATION OF NEBRASKA.

TIRE AND METHOD OF MAKING THE SAME.

1,270,247.     Specification of Letters Patent.     Patented June 18, 1918.

Application filed February 17, 1916. Serial No. 78,910.

*To all whom it may concern:*

Be it known that I, OLIVER H. CLOYD, citizen of the United States, residing at Peoria, in the county of Peoria and State of Illinois, have invented certain new and useful Improvements in Tires and Methods of Making the Same; and I do hereby declare that the following is a full, clear, and exact description of the invention, which will enable others skilled in the art to which it appertains to make and use the same.

This invention relates to a method of constructing a vehicle tire of the pneumatic type and it relates further to the tire itself produced by said method.

One of the objects of the invention is the provision of a new method of constructing a tire in a very simple manner at a comparatively low cost, by which a tire of an exceedingly strong form may be produced.

Another object is to employ a novel manner of constructing a tire that will be comparatively low in cost of production and that will be as nearly puncture proof as possible consistent with proper resiliency.

Still another object is to construct a tire from a new and novel form of material by whose use a tire of considerable resiliency can be produced.

Another object is to construct a tire that will have a long life as compared to those commonly constructed by reason of the new form of material used in its construction, by which wearing of the fabric layers upon one another is largely avoided and breaking of the fibers is prevented to a large degree, and that by reason of the use of such new form of material punctures and blow-outs will be very materially reduced.

Another object is the production of a tire of superior strength and wearing qualities, the fabric parts forming the same being so disposed that there are no splicing places whatever throughout the tire at which separation might occur; the tire being a complete unit in structure as will more clearly appear in the following specification, aided by the accompanying drawing, in which, Figure 1 is a cross section of a tire constructed by my improved method.

Fig. 2 shows, in perspective, and on a much smaller scale, a portion of a core upon which the tire is built, together with a pair of wires or the like arranged concentrically to the said core, the latter being overlaid with a portion of a strip of my new form of fabric which forms the body of the tire.

Fig. 2ª shows, in perspective, a portion of the new tire fabric.

Fig. 3 is a cross section of the core on a much larger scale than that of Fig. 2, showing the fabric thereon in one of first positions of its manipulation.

Fig. 4 is a similar view illustrating the manner of the disposal of the several loops or plies of the fabric.

Fig. 5 shows, in perspective, a portion of the core and the position of the lappings or plies of the fabric in one form of the tire.

Fig. 6 is a plan of a portion of the core and a slightly different disposal of the plies of fabric from that shown in Fig. 5; and, Fig. 7 is a similar view showing the same disposal of the plies as those in Fig. 5.

1 indicates any usual core in the form of a ring upon which to construct a tire, a segment of which is shown in Fig. 2. 2 indicates the fabric of which the tire is constructed made up of a series of parallel strands of heavy cord as clearly shown in the several figures. These strands lie side by side and are treated with rubber so as to form a sheet of what may be termed "rubberized cord" which when vulcanized forms a strong closely formed thick ply having great puncture-resisting qualities.

In the specification I shall refer to this material as a "rubberized cord" to designate the materials of which the body of a tire is made.

In practising the invention a single sheet of the rubberized cord of the proper and predetermined size is cut for the tire to be constructed.

As an example, in building a 34"x4"

tire a strip of the fabric 32" wide and 90" long is used. The width of the strip in the example of tire construction now to be described is measured along the length of the cords, while the length of the strip is understood to be the distance in a direction measured at right angles to said cords. The strip thus cut is placed upon the core 1, its length entirely encircling said core. The two ends of the strip are abutted as at 3, Fig. 2, and by reason of the unvulcanized rubber with which the strands or cords are covered and filled the abutting ends are firmly held together. Thus there is produced a continuous cylindrical band whose strands or cords lie at right angles to the plane of the core.

The portions of the strip projecting beyond each side of the core are now rolled down at each side of the latter to the point where each bead is to be located, taking the form shown in Fig. 3 in full lines, the dotted lines in that figure indicating the position of the fabric when placed in position for this operation and corresponding to Fig. 2, the numeral 4 being used to designate this fabric ply thus laid upon the core.

An endless band or ring 5 of wrapped, braided or twisted wire, or even a single strand of wire, of the proper diameter to afford the desired strength and to be a part of the usual bead, is placed upon each portion of the strip thus brought down. The position of these wires is clearly illustrated in the first three figures, particularly in Figs. 2 and 3 with especial relation to the core 1, and the adhesive quality of the rubber filling of the fabric may serve to hold the wires in position for further operations. Now, one of the portions 6, Fig. 4, cf the fabric is carried through the described wire, band or ring 5 adjacent it and brought up and recurved upon itself and placed upon the first layer 4, its end 7 being terminated at the opposite side of the tire and substantially abutting on the ring or band 5 at that side as in Fig. 4.

The opposite portion 8 is now carried up and over the core upon the portion 6, just laid down, its edge 9 preferably terminating near the ring or band at the side of the core opposite that at which the terminal edge of 7 lies, its position in the finished tire being best shown in Fig. 1 wherein the layer or portion 6 is drawn over the ring or band up against the portion 4, the edge 9 lying upon it.

While Fig. 4 shows the disposal of the several plies it is rather diagrammatic than otherwise for the purpose of more clearly showing such disposal as will presently appear.

It is now seen that the tire consists of but one strip of fabric which is of sufficient width to be made to overlie the core in three plies, their edges terminating at the rings or bands 5 and afterward being embedded in the usual bead and within the outer rubber covering 10, the whole being then vulcanized to produce the finished tire.

If the number of the plies of the fabric is to be increased a still wider strip would be used but the fabric would, perhaps, for this purpose be reduced in thickness by the use of lighter weight cords. But in practice the three-ply construction supplies the proper strength and furnishes the desired resiliency and answers every requirement in a thoroughly practical tire.

It is preferable to cross the plies of fabric so that the lines of separation of the cords of one ply will not lie parallel to those of one another. Therefore, after the two portions of the fabric have been carried down, through and around the wires 5 as already described, Fig. 3, the right hand portion 6, for example, in being carried over and laid upon the inner or first ply 4 is so manipulated that, as shown in Figs. 5 and 7, the cords or strands thereof will lie diagonally of those of said ply 4 at any desired angle so long as they are not parallel thereto. The edge 7 must, naturally, be cut at an angle to the length of the cords so that the cut edge will be parallel to the wire 5 at that side. The ply 8, which is the outer one, part of whose ends are shown extending below the ring or band 5 in Fig. 5, is then carried up parallel to the inner ply 4, as clearly shown in Fig. 7.

It has been stated that Fig. 4 is in the nature of a diagram. This is in order to show the manner of the disposal of the several plies and in which the cords of the middle ply 6 would lie parallel to those of the inner and outer plies 4 and 8 respectively, but in practice this is not the case but on the contrary it will be observed that in both Figs. 1 and 5 the cords of the said middle ply must be severed in cutting through the tire toward its axis of rotation from the fact that the cords in said ply extend at an angle to those of the inner and outer ones as already explained. In carrying the ply 6 around the bead 5 at the right in Fig. 1 and snugly forcing it down upon the inner ply 4 an outer recess or angle is created in which the end 9 of the outer ply 8 is placed.

Both sides of the tire at the beads are practically of the same width and present an entirely uniform construction to the eye, and it is to be understood that any of the types of tires may be readily constructed whether clencher, quick detachable or other form.

In Fig. 6 I show a slightly different arrangement of the plies of the fabric in which 12 indicates the inner ply corresponding to 4 of the other figure. This ply, as will be been, extends diagonally of the core. That is to say, its cords run at an angle to the plane of the core, the cords of the fabric strip, Fig. 2ª, in this form lying at an angle to the edges of said strip, one of the portions after being carried through its ring 5 being so disposed that its cords lie at right angles to the plane of the core, as indicated at 13 in Fig. 6, the outer or finishing ply 14 again extending diagonally of the ply 13 and at angle to the inner ply 12, its cords extending in a direction directly opposite to those of said ply. Thus all three plies in this structure extend in different directions as compared with the form in Fig. 7.

I thus desire to make it clear that it is not my intention to confine myself to any particular disposal of the various plies as regards the directions in which the cords or strands extend.

From the fact that the friction fabric is made from strong cord an exceedingly strong material results and when several plies of such overlie one another, and are held firmly by the vulcanized rubber, especially when the cords of the several plies lie at different angles, the puncture-resisting qualities are of the best, it being clear that a nail or other pointed obstacle must meet each heavy resisting cord. Also the chances for so-called "blow-outs" are reduced to a minimum because of the superior strength and wearing qualities, those advantages being resident in my tire.

A very important point in the tire is that the fabric in being continuous by extending around the wire leaves no chance for separation of the bead or its wire from the other parts or from each other.

Not only is the construction of the tire new in the disposal of the various plies of one single piece whereby the various advantages set forth are obtained, but the method by which it is produced I also believe to be entirely new and novel.

I am fully aware of two forms in which it has been proposed to construct a tire each of which includes two separate portions of the tire fabric or cords extending through the tread portion from one bead to another, the edges of the fabric or the ends of the cords terminating at the beads.

I am aware, also, that it has been proposed to construct a tire of a single portion of fabric, carrying it around both bead-rings and terminating its opposite edges at opposite sides of the tire at points between the tread and base of the tire.

But my invention, as seen, lies in using a single width of the fabric, carrying it around both bead-rings, and terminating opposite edges of said single width at said rings making at least three continuous layers of said single width of fabric from bead-ring to bead-ring across said tread thereby creating an exceedingly strong tire of long life with no likelihood of giving way at the beads or of weakening where blow-outs usually occur.

A tire constructed with its ends thus firmly embedded and held in the beads has no splices at any point in its structure that would likely separate under pressure or result in the parts giving way and rupturing the tire. Thus I form a tire that can neither separate longitudinally nor in a lateral direction.

In some of the claims I refer to the strands of the layers of fabric as lying at an angle to those of the other layers and by this I mean to include fabric of any form whether woven so as to have cross strands or of the form of parallel cords as described.

I, of course, do not wish to confine myself to the exact construction and arrangement shown, as already intimated, since slight changes may be made such as will lie within the meaning of the invention and the scope of the accompanying claims.

Having thus described my invention, I claim:—

1. In a method of constructing a tire shoe, the steps which consist in arching a formed strip of tire fabric to create a ring or band, connecting the ends of the same, arching said band throughout its length to form the shoe with the edges of the fabric separated, placing a ring upon each side portion thus disposed, carrying one of the side portions through its respective ring and drawing it at an angle to the plane of the shoe over upon the arched portion terminating its edge at the ring at the opposite side of the shoe, carrying the other portion through its ring and drawing it at an angle to the plane of the shoe and at an angle to the direction in which the first portion is drawn, and laid upon the same and terminating the edge thereof at the ring at the opposite side.

2. In a method of constructing a tire shoe, the steps which consist in utilizing an endless band of fabric, arching the same circumferentially and carrying the resulting side portions inward toward the point from which the band is described, placing a ring against each portion, carrying one of the portions through its adjacent ring and upon the arched portion diagonally across the latter and terminating its edge at the opposite ring, carrying the opposite portion through its respective ring, and placing the same upon and with its strands extending diagonally of those of the portion just laid down, and terminating its edge at the ring at the opposite side.

3. In a method of constructing a tire shoe, the steps which consist in forming an endless band of fabric made up of a series of rubberized parallel cords, arching the band circumferentially and carrying the resulting parallel edges of the band inward toward each other within the band, placing a bead ring against the outer side of each portion thus disposed, carrying one of the portions through its respective ring and upon the arched portion with its cords lying diagonally of those of the latter, terminating its edge at the opposite ring carrying the opposite portion through its ring and placing the same upon and with its cords extending diagonally of those of the portion just laid down and terminating its edge adjacent the ring at the opposite side.

4. In a method of constructing a tire shoe, the steps which consist in forming an endless band of fabric, arching the same circumferentially and carrying the resulting side portions inward toward each other, placing a bead ring against each portion, carrying one of the portions through its respective ring and upon the arched portion with its strands lying diagonally of those of the latter, carrying the opposite portion through its ring and placing the same upon and with its strands extending diagonally of those of the portion just laid down and terminating its edge adjacent the ring at the opposite side.

5. In a method of constructing a tire shoe, the steps which consist in utilizing an endless band of fabric, arching the same circumferentially and carrying the resulting side portions inward toward the point from which the band is described, placing a ring against each portion, carrying one of the portions through its adjacent ring and upon the arched portion diagonally across the latter and terminating its edge at the opposite ring, carrying the opposite portion through its respective ring, and placing the same upon the portion just laid down, and terminating its edge at the ring at the opposite side.

6. In a method of constructing a tire shoe, the steps which consist in outwardly arching circumferentially throughout its length an endless band of fabric made up of parallel strands, extending the opposite portions of the band parallel to one another, placing a ring at the outer side of each portion, drawing the portions through their adjacent rings and back over the arched portion and upon one another with the strands of alternate layers lying at an angle to each other.

7. In a method of constructing a tire shoe, the steps which consist in placing an endless band of fabric made up of parallel strands upon a ring-shaped core, arching said band circumferentially over said core and carrying the portions of said band down at each side of the core, placing a band or ring upon each portion, carrying each portion through its adjacent ring and recurving it upon the arched portion and upon the other portion with the strands of alternate layers lying at an angle to each other, the strands of the inner and outer plies lying at an angle to the intermediate layer.

8. In a method of constructing a tire shoe, the steps which consist in placing an endless band of fabric upon a ring shaped core, said band being made up of a series of parallel rubberized cords, the same extending across and laterally of the core, carrying the side portions of the band down around each side of the latter, placing a ring upon each side portion, carrying each said portion through its respective ring, recurving said portions and laying the same back upon the part overlying the core and upon one another, the cords of the several layers of the fabric lying at an angle to one another, the edge of each portion being brought down to and terminating substantially at the ring at the side of the shoe opposite that having the portion from which that edge extends, and attaching a tire bead in which the said edges are embedded.

9. In a method of constructing a tire shoe, the steps which consist in placing an endless band of fabric made up of parallel strands upon a ring-shaped core, arching said band circumferentially over said core and carrying the portions of the band down at each side of the core, placing a ring upon each portion, carrying each portion through its adjacent ring, recurving said portions upon the arched portion and upon one another and with the strands of a ply last laid down lying at an angle to those of a next preceding one.

10. In a method of constructing a tire shoe, the steps which consist in forming a band from a strip of tire fabric made up of strands the ends of said strands forming the edges of the band, drawing the side portions of the band toward one another within said band, placing a bead-ring at each side portion, drawing one edge through its respective bead-ring, recurving and carrying it over and upon the layer of the strip first laid down, with its strands at an angle to those of said layer, and carrying its other edge through its respective ring and recurving it and carrying it over and upon the layer last laid down with its strands disposed at an angle to those of that layer whereby the strands of alternate layers will lie across one another.

11. A tire shoe comprising in its construction a single endless band of friction material made up of parallel cords, the ends of the cords constituting the edges of the band, said band having a width of measurement substantially three times the measurement of the circumference of the tire taken transversely and arched throughout for substantially one third its width along its medial longitudinal portion, a bead ring at each outer side of the band, the portions of the band outward from the arched portion being recurved and extended through their respective rings, one of the said portions lying upon the said arched portion with its cords extending at an angle to those of the said arched portion, its edge terminating at an opposite ring, the other portion lying upon the portion just laid down with the cords lying at an angle to those last laid down, the edge of the same terminating at the other ring.

In testimony whereof I affix my signature in presence of two witnesses.

OLIVER H. CLOYD.

Witnesses:
　W. I. SLEMMONS,
　L. M. THURLOW.